(12) United States Patent (10) Patent No.: US 8,899,122 B2
Van Druten et al. (45) Date of Patent: Dec. 2, 2014

(54) TRANSMISSION SYSTEM

(71) Applicant: DTI Group, BV, Eindhoven (NL)

(72) Inventors: Roell Marie Van Druten, Eindhoven (NL); Alexander Franciscus Anita Serrarens, Waalre (NL); Bas Gerard Vroemen, Eindhoven (NL)

(73) Assignee: DTI Group, B.V., Eindhoven (NL)

( * ) Notice: Subject to any disclaimer, the term of this patent is extended or adjusted under 35 U.S.C. 154(b) by 0 days.

(21) Appl. No.: 13/951,136

(22) Filed: Jul. 25, 2013

(65) Prior Publication Data

US 2013/0305859 A1 Nov. 21, 2013

Related U.S. Application Data

(63) Continuation of application No. PCT/NL2012/050042, filed on Jan. 25, 2012.

(30) Foreign Application Priority Data

Jan. 25, 2011 (NL) ..................................... 2006069
Jan. 2, 2012 (NL) ..................................... 2008073
Apr. 1, 2012 (NL) ..................................... 2008081

(51) Int. Cl.
*F16H 3/02* (2006.01)
*B60K 6/365* (2007.10)
*F16H 3/12* (2006.01)
*F16H 37/04* (2006.01)
*F16H 3/08* (2006.01)
*F16H 37/10* (2006.01)

(52) U.S. Cl.
CPC .......... *F16H 3/02* (2013.01); *F16H 2003/0826* (2013.01); *F16H 2200/2023* (2013.01); *F16H 2200/0065* (2013.01); *B60K 6/365* (2013.01); *F16H 2037/103* (2013.01); *F16H 2200/0052* (2013.01); *F16H 2200/0017* (2013.01); *F16H 2200/2035* (2013.01); *F16H 3/126* (2013.01); *F16H 2200/006* (2013.01); *F16H 2003/0818* (2013.01); *F16H 2200/2005* (2013.01); *F16H 2200/0047* (2013.01); *F16H 37/042* (2013.01)
USPC .............................................. 74/331; 74/333

(58) Field of Classification Search
USPC .................................... 74/325, 331, 333, 340
See application file for complete search history.

(56) References Cited

U.S. PATENT DOCUMENTS

| | | | | |
|---|---|---|---|---|
| 5,558,589 | A * | 9/1996 | Schmidt | 475/5 |
| 5,730,676 | A * | 3/1998 | Schmidt | 475/5 |
| 7,232,393 | B2 * | 6/2007 | Bucknor et al. | 475/5 |
| 8,083,626 | B2 * | 12/2011 | Conlon et al. | 475/5 |
| 8,313,402 | B2 * | 11/2012 | Park | 475/5 |
| 2003/0148847 | A1 * | 8/2003 | Kawamoto et al. | 475/207 |
| 2003/0166429 | A1 | 9/2003 | Tumback | |
| 2005/0227803 | A1 | 10/2005 | Holmes | |
| 2006/0128513 | A1 * | 6/2006 | Tata et al. | 475/5 |

(Continued)

*Primary Examiner* — Troy Chambers
*Assistant Examiner* — Valentin Craciun
(74) *Attorney, Agent, or Firm* — Eric Karich

(57) ABSTRACT

A transmission system has a clutch module which has a single input and two outputs, where clutch devices are located between the outputs and the input. The transmission system further includes a transmission module which has two inputs and a single output, the transmission module comprising at least two sub-transmissions where at least a single speed transforming gear or a single transmission clutch is located between an input and an output of each sub-transmission. The two outputs of the clutch module are connected here to both inputs of the transmission module.

1 Claim, 4 Drawing Sheets

(56) References Cited

U.S. PATENT DOCUMENTS

| | | | |
|---|---|---|---|
| 2007/0072723 A1* | 3/2007 | Klemen et al. | 475/5 |
| 2007/0099738 A1* | 5/2007 | Holmes | 475/5 |
| 2008/0064550 A1* | 3/2008 | Holmes | 475/5 |
| 2008/0125264 A1* | 5/2008 | Conlon et al. | 475/5 |
| 2010/0179024 A1* | 7/2010 | Holmes | 477/5 |
| 2010/0273594 A1* | 10/2010 | Sung | 475/5 |

* cited by examiner

TRANSMISSION SYSTEM

CROSS-REFERENCE TO RELATED APPLICATIONS

This application for a utility patent is a continuation of a previously filed PCT patent application, now abandoned, having the application number PCT/NL2012/050042, filed 25 Jan. 2012 (WO 2012/102613 A1).

This application also claims the benefit of Netherlands National Applications No. 2006069, filed 25 Jan. 2011; No. 2008073, filed 2 Jan. 2012; and No. 2008081, filed 4 Jan. 2012.

DESCRIPTION

1. Field of the Invention

The invention relates to a transmission system.

The transmission system comprises:
- a clutch module, having a single input and a first and a second output, where between the first output and the input is located a first clutch device equipped with first energizing means, and between the second output and the input is located a second clutch device equipped with second energizing means, and
- a transmission module, having a single output and a first and a second input, where between the first input and the output is located a first sub-transmission equipped with at least a single speed transforming gear and/or a single transmission clutch, and between the second input and the output is located a second sub-transmission also equipped with at least a single speed transforming gear and/or a single transmission clutch, where the two outputs of the clutch module are connected to the two inputs of the transmission module.

A clutch device is to be understood in this context as for example a clutch, a brake or an electromotor. Energizing means may in this respect be, for example, an electromotor with a speed transforming gear, a mechanical spring, a hydraulic cylinder or an electric coil respectively.

The speed transforming gear in this context is preferably a mechanical transmission such as a geared transmission, a planetary gear set, a continuously variable transmission, a chain transmission etc., but the speed transforming gear need not of necessity be a speed reduction or speed acceleration, but may also be a 1 to 1 transmission formed for example by a shaft.

2. State of the Art

A transmission system of this type is known from EP-A-1 625 037. In this known transmission system the clutch module comprises a planetary gear set and a friction clutch and the transmission module comprises a shaft connected to the planetary gear set as well as a clutch-connected transmission having a plurality of coupleable geared transmissions. The purpose of the planetary gear set is to enable transmission gear ratio changes while the torque on the output is maintained. The transmission module should then possess an adequate number of different speed transforming gears which are desired for cooperation with the engine and for achieving the desired comfort and performance of the vehicle in which this transmission is used.

SUMMARY OF THE INVENTION

It is an object of the invention to provide a transmission system of the type defined in the opening paragraph in which the transmission module can be arranged in a simpler and more cost effective manner, whereas the transmission system as a whole still has comparable or even better properties (fewer gear wheels, more gears, better distribution of the gear ratios, fewer friction elements, and in which it is still possible to change the gear ratio while maintaining the torque on the output), without the clutch module being appreciably more expensive. For this purpose the transmission system according to the invention is characterized in that the transmission system further includes a third clutch device equipped with third energizing means, and between the input and the first output are located transmission means comprising at least four rotational members, a first rotational member of which is connected to the input, a second rotational member of which is connected to the first output, and a third and a fourth rotational member of which are connected to the first and the third clutch device respectively. By energizing either clutch device or both, three different speed transformations can be realized with the clutch module. This may then be effected for any gear ratio in the transmission module, so that three different speed transformations may be realized with any gear ratio in the transmission module.

The speed transforming means are preferably formed by a bypass transmission, for example a planetary gear set. Furthermore, the first and/or third clutch device is preferably arranged as a brake. This brake is preferably formed by a friction brake which can dissipate energy or by a claw clutch to the firm world which cannot dissipate energy. For example the housing of the transmission module may function as the firm world.

The first and/or third clutch device may also be arranged as an electromotor in which the stator is connected to the firm world and the rotor is connected to the rotational member involved. Also the second clutch device may be arranged as an electromotor.

The second clutch device is preferably formed by a clutch which is located between the input and the second output of the clutch module. This clutch may be arranged as a friction clutch which can dissipate energy or as a claw clutch which cannot dissipate energy.

In a preferred embodiment the first clutch device is formed by a friction brake, the second clutch device is formed by a friction clutch and the third clutch device is formed by a claw clutch and/or synchronizer which cannot or can hardly dissipate energy.

In order to further enhance the functionality of the transmission system, a further embodiment of the transmission system according to the invention is characterized in that the transmission system comprises a short circuit clutch which is located between the two outputs of the clutch module and/or the two inputs of the transmission module. Even more enhancement of the functionality may be obtained if the transmission system comprises a further short circuit clutch which is also located between the two outputs of the clutch module and/or the two inputs of the transmission module and is connected in series with the short circuit clutch, where the two outputs of the clutch module and/or the two inputs of the transmission module can only be coupled together by closing the two short circuit clutches.

The short circuit clutches may preferably be switched by means of a single operating element with which three positions are possible: either or the two short circuit clutches closed.

An embodiment of the transmission system according to the invention is characterized in that the transmission module further includes a third sub-transmission comprising at least one speed transforming gear, the input of which third sub-transmission is connected to the two short circuit clutches at a location in between the two short circuit clutches, and the output of which is connected to the output of the transmission module.

The second clutch device is preferably formed by a clutch which is located between the input and the second output of the clutch module.

Preferably, the speed transforming gear in one or more of the sub-transmissions can be switched on/off by means of a transmission clutch which forms part of the sub-transmission. One or more of the transmission clutch(es) and/or the short circuit clutch(es) is/are then preferably arranged as a claw clutch and/or synchronizer.

A further embodiment of the transmission system according to the invention is characterized in that the transmission system comprises an electromotor which is coupled or can be coupled to one or more of the components of the transmission system. The components of the transmission system are then for example said speed transforming gears, clutches, rotational members etc. The electromotor is then preferably used for synchronizing one or more of the transmission clutches, short circuit clutches or clutch devices. The electromotor can also be used for electrically driving the load (the drive wheels) or braking it.

The following embodiments are preferred for achieving optimum gear ratios in the transmission system according to the invention. In a first one of these embodiments the gear ratio of the speed transforming means of the clutch module is selected such that it is retarding towards the output of the clutch module if the first clutch device is braked. In a further embodiment the gear ratio of the speed transforming means of the clutch module is chosen such that it is retarding towards the output of the clutch module if the third clutch device is braked. Preferably, this gear ratio is less retarding than if the first clutch device is braked. The most retarding speed transforming gear (within the transmission module) is then located in the second sub-transmission.

In yet a further embodiment the highest (least retarding) transmission speed transforming gear of the aggregate transmission system is obtained by means of the second clutch device and the first sub-transmission, while the short circuit clutch or all short circuit clutches is/are closed. In yet again a further embodiment the lowest (most retarding) transmission speed transforming gear ($1^{st}$ gear) of the aggregate transmission system is obtained by means of the first clutch device, the speed transforming means of the clutch module and the second sub-transmission, while the short circuit clutch or all short circuit clutches is/are closed. In still a further embodiment the $2^{nd}$ gear of the transmission system is obtained by means of the third clutch device and the second sub-transmission.

Yet a further embodiment of the transmission system according to the invention is characterized in that the transmission module comprises a reverse gear which is located between the sub-modules and comprises two extra gear wheels which are in meshing engagement with gear wheels of the speed transforming gears of the sub-transmissions. Between the two extra gear wheels is preferably located a reverse clutch. The two extra gear wheels are preferably coaxially positioned on a lay shaft.

The invention likewise relates to a method of switching between gears in a transmission system according to the invention. With respect to this method the invention is characterized in that switching from a lower (for example $1^{st}$) gear to a higher (for example $2^{nd}$) gear of the transmission system, while drive torque on the output is maintained, is realized by closing the second clutch device and energizing the first clutch device less until the third clutch device can be closed substantially synchronously.

A further method of gear switching in a transmission system according to the invention is characterized in that at least one switching operation takes place in the transmission system where switching from the $x^{th}$ to the $(x+1)^{th}$ gear of the transmission system takes place via the $(x+2)^{th}$ gear.

BRIEF DESCRIPTION OF THE DRAWINGS

The invention will be described below in more detail based on examples of embodiment of the transmission system according to the invention represented in the drawing figures, in which.

DETAILED DESCRIPTION

Figure 1:
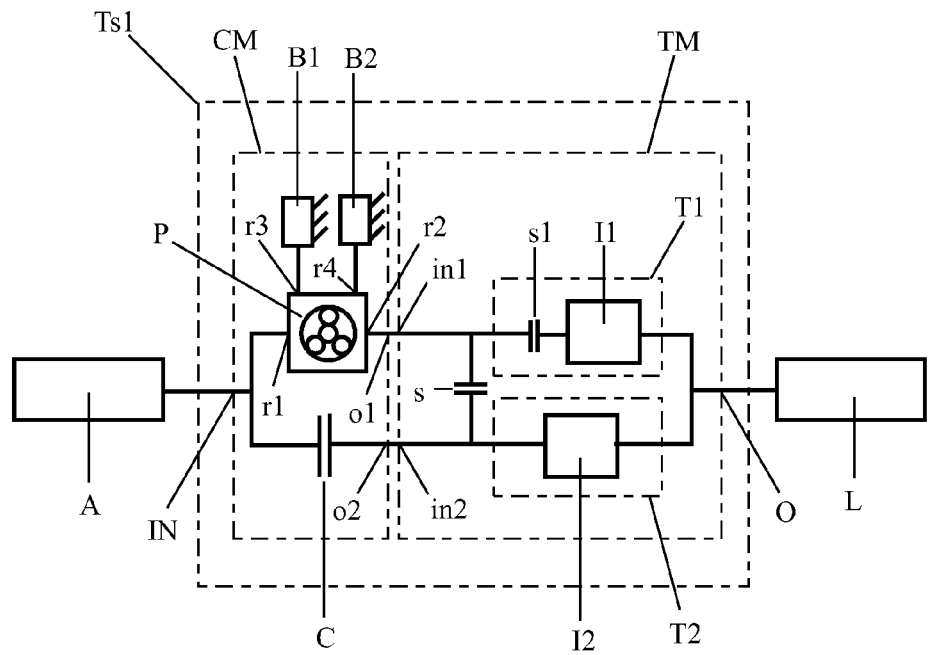
FIG. 1 shows a first embodiment of the transmission system according to the invention comprising two sub-transmissions.

FIG. 1 gives a diagrammatic representation of a first embodiment of the transmission system according to the invention. The transmission system Ts1 comprises a clutch module CM which has a single input IN and a first and a second output o1 and o2, and a transmission module TM which has two inputs in1 and in2 and a single output O. The transmission system is located in a vehicle that has a drive source A, for example a combustion engine, which is connected to the input IN and drive wheels L which are connected to the output O.

Between the first output of and the input IN a bypass transmission P is located which is formed by a planetary gear set having four rotational members, a first rotational member r1 of which is connected to the input IN, a second rotational member r2 of which is connected to the first output o1, and a third and a fourth rotational member r3 and r4 of the bypass transmission P are connected to two clutch devices B1 (first clutch device) and B2 (third clutch device) respectively. Between the second output o2 and the input IN is located a second clutch device formed by a clutch C which comprises second energizing means (for example formed by a mechanical spring). Each of the clutch devices B1 and B2 may be arranged as a friction brake, for example a wet plate or a dry plate friction brake or as a claw clutch to the firm world. The firm world is formed by the housing of the transmission module. The clutch device C may also be arranged as a friction clutch, for example a wet or dry plate friction clutch.

The transmission module TM comprises two sub-transmissions T1 and T2. The first sub-transmission T1 is located between the first input in1 and the output O and is formed by a first geared transmission I1 and a transmission clutch s1 which is formed by a claw clutch. The second sub-transmission T2 is located between the second input in2 and the output O and is formed by a second geared transmission I2.

The two outputs o1 and o2 of the clutch module are connected to the two inputs in1 and in2 of the transmission module.

The brake B1 is preferably formed by a friction brake which can dissipate energy and the brake B2 is preferably formed by a claw clutch or synchronizer to the firm world which cannot or can hardly dissipate energy.

The transmission system further includes a short circuit clutch s which is located between the two inputs in1 and in2 of the transmission module.

The gear ratio of the bypass transmission P is retarding towards the first output o1 of the clutch module if the first clutch device B1 is braked.

The gear ratio of the bypass transmission P of the clutch module is retarding towards the second output o2 of the clutch module if the third clutch device B2 is braked. This gear ratio is less retarding than if the first clutch device is braked.

The most retarding gear ratio in the transmission module is present in the second sub-transmission T2.

The highest transmission speed transforming gear of the aggregate transmission system is obtained by means of the second clutch device C and the first sub-transmission T1, while the short circuit clutch s is closed, and the lowest transmission speed transforming gear ($1^{st}$ gear) of the aggregate transmission system is obtained by means of the first clutch device B1, the bypass transmission P of the clutch module and the second sub-transmission T2, while the short circuit clutch s is closed. The $2^{nd}$ gear of the transmission system is obtained by means of the third clutch device B2 and the second sub-transmission T2.

Switching from the $1^{st}$ gear to the $2^{nd}$ gear of the transmission system while maintaining the drive torque on the output may also be realized by closing the third clutch device C and energizing the first clutch device B1 less until the third clutch device B2 can be closed substantially synchronously, as a result of which the third clutch device B2 can be arranged as a claw clutch and/or synchronizer.

In lieu of the geared transmission I1 and transmission clutch s1 shown, the first sub-transmission T1 may also be a continuously variable transmission either or not connected in series with a geared transmission.

Figure 2:
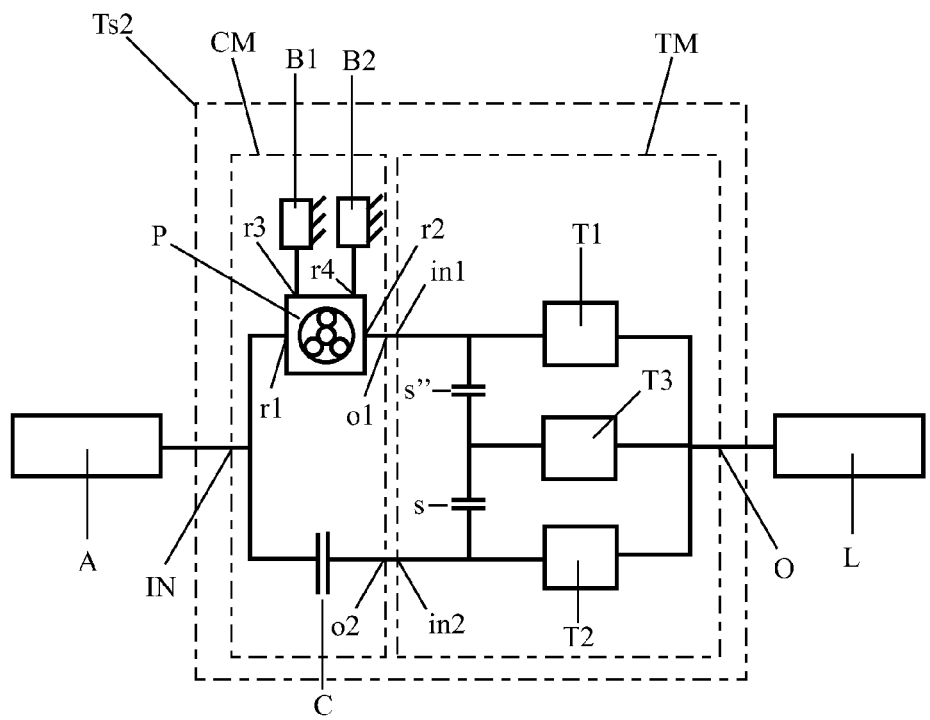
FIG. 2 shows a second embodiment of the transmission system according to the invention comprising three sub-transmissions.

FIG. 2 shows a second embodiment of the transmission system according to the invention. All components of this transmission system that are similar to those of the first embodiment are referred to by like reference numerals. In this transmission system Ts2 the transmission module TM further includes a third sub-transmission T3 which is located between the first and second sub-transmissions T1 and T2 and a further short circuit clutch s". This further short circuit clutch s" is located between the inputs of the first and third sub-transmissions T1 and T3 and the short circuit clutch s is located between the inputs of the third and second sub-transmissions T3 and T2. The short circuit clutches s and s" can be switched by means of a single operating element with the possibility of three positions: either or the two short circuit clutches closed. Each one of the short circuit clutches s and s" may be arranged as a friction clutch, as a claw clutch, as a synchromesh clutch, or as a freewheel bearing/freewheel clutch.

The clutch C can connect the first and second rotational members r1 and r2 to each other by means of the two short circuit clutches s and s" as a result of which the bypass transmission P is short circuited and forms a 1:1 gear ratio. The first rotational member r1 of P is preferably arranged as a ring gear, the second rotational member r2 is preferably arranged as a planet carrier and the third and fourth rotational members r3 and r4 are preferably arranged as sun gears. The clutch C is preferably arranged as a friction clutch but may also be arranged as a claw clutch, or as an electromotor in which the rotor and the stator form the individual clutch halves (the stator may be rotating then). The short circuit clutch C may also be located in between the input shaft IN and the short circuit clutches s and s". The short circuit clutches s and s" are preferably arranged as claw clutches but may also be arranged as synchromesh or friction clutches.

Within each sub-tansmission is located at least a single speed transforming gear and/or a transmission clutch, which can be positioned both before and after the speed transforming gear. The speed transforming gears may be arranged as a shaft (1:1 gear ratio) or as a geared transmission, chain transmission, planetary gear set (where the transmission clutch can connect one of the rotational members of it to the firm world/transmission housing), continuously variable transmission, friction gearing transmission or another transmission that is capable of transferring torque.

The clutch device B1 is arranged as a friction brake and the clutch device B2 as a claw clutch to the firm world.

The gear ratios are preferably as follows:
P with B1 closed is retarding towards the output,
P with B2 closed is retarding towards the output, but less retarding than if B1 is closed,
Geared transmission I1 (within T1) has the highest gear ratio (accelerating) towards the output,
Geared transmission I2 (within T2) has the lowest gear ratio (retarding) towards the output, and
Geared transmission I3 (within T3) has a gear ratio that is situated between I1 and I2.

The choice of the gear ratios is important for the operation of the transmission system. By means of the clutch devices B1, B2 and C it is possible to switch from one gear to the next and vice versa while the torque transfer is maintained. Since the geared transmission Ic of the clutch C is direct (1:1) and this geared transmission is situated above the speed transforming gear Ip1 of the bypass transmission P with brake B1 closed and above the speed transforming gear Ip2 of the bypass transmission P with brake B2 closed, it is also possible to switch from Ip1 to Ip2 and from Ip2 to Ic (and vice versa) while the torque transfer is maintained (even if brake B2 is arranged as a claw clutch to the firm world). In this manner it is thus possible to switch 3 speed transforming gears by means of the clutch module (with two friction elements B1 and C). This may apply to any speed transforming gear Ix in the transmission module TM, so that with each speed transforming gear Ix in the transmission module it is possible to realize 3 gear ratios of the transmission system.

Since Ip1 produces the lowest gear ratio and Ic the highest gear ratio, when changing from the highest gear by means of Ix to the (next) lower gear by means of I(x+1) or vice versa, it is also possible to switch with torque transfer (without the need for realizing this via an idler gear). The outputs of the bypass transmission P and the clutch C are then to be individually coupled to the geared transmissions Ix and I(x+1). The transmission short circuit clutches s and/or s" are then necessary for realizing this. Furthermore, it should always be possible for the output of the bypass transmission P to be coupled with a higher geared transmission Ix while the output of the clutch C is coupled with a lower geared transmission Ix. For realizing this, I1 is to be the highest geared transmission and I2 the lowest geared transmission and I3 in between the two.

The retarding geared transmission Ip1 and the 1:1 gear ratio (clutch C) may be selected to be symmetrically situated around Ip2 for creating a symmetrical distribution of the gears. In the case of a harmonic distribution of the gears, an asymmetrical distribution may be selected in which step size Ip1 to Ic exceeds that of Ic to Ic. A fine harmonic distribution may further be achieved by skipping the centre geared transmission (with Ip2) within the sub-transmission T2 and switching directly between Ip1 and Ic, as a result of which a larger step size occurs between $1^{st}$ and $2^{nd}$ gear. The step size between $2^{nd}$ and $3^{rd}$ gear may be selected at random, by means of the gear ratio between T1 and T2 (or T3).

By selecting different configurations of the clutch devices B1 and B2, different transmission systems with distinctive functionalities may be realized as is indicated in a table hereinbelow.

| Version | B1 | B2 |
|---|---|---|
| 1 | Brake | Brake |
| 2 | Electromotor | Electromotor |
| 3 | Electromotor | Brake |
| 4 | Brake | Electromotor |
| 5 | Brake + electromotor | Brake |
| 6 | Brake | Brake + electromotor |
| 7 | Electromotor + brake | Electromotor |
| 8 | Electromotor | Electromotor + brake |
| 9 | Electromotor + brake | Electromotor + brake |

In the above embodiments the brake may be arranged as a friction brake which can dissipate energy, or a claw clutch fixed to the firm world and which cannot dissipate energy. The electromotor may be arranged as a motor and/or generator by which the vehicle can be driven and by which the transmission clutches can be synchronized, or as a small servomotor by which only the synchronization of the transmission clutches can be carried out. Furthermore, it is possible to make combinations of the above.

Figure 3:
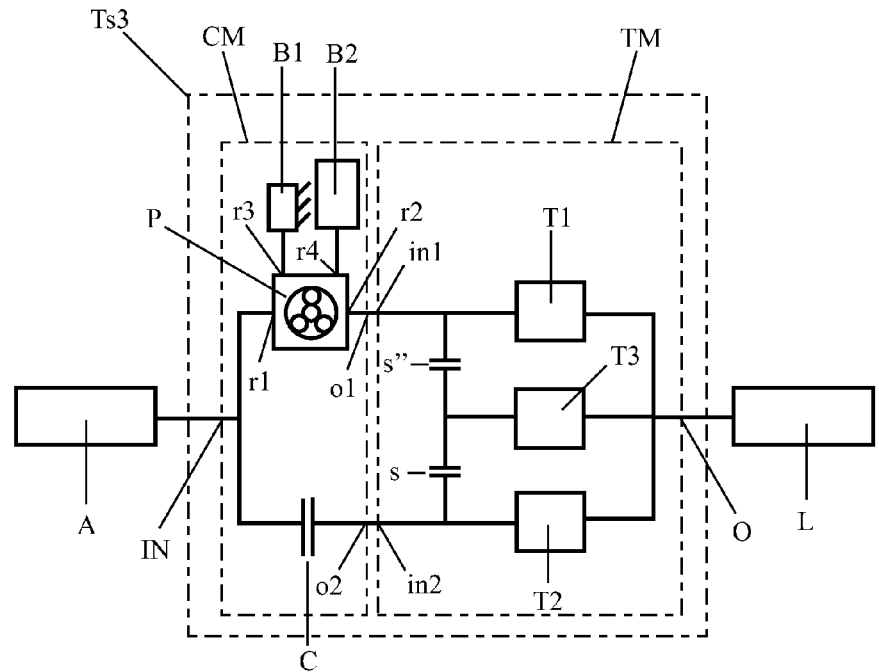
FIG. 3 shows a third embodiment of the transmission system according to the invention comprising the third clutch device arranged as an electromotor.

FIG. 3 shows a third embodiment of the transmission system according to the invention. All components of this transmission system that are similar to those of the second embodiment are referred to by like reference numerals. In this transmission system Ts3 the clutch device B2 is arranged as an electromotor in which the stator is connected to a transmission housing and the rotor is connected to the fourth rotational member r4 (and optionally to a brake), and in which the clutch device B1 is arranged as a brake.

There are two preferred embodiments here:
1) Clutch C is a friction clutch.
  Driving off is effected by energizing the electromotor as a generator after which the brake B1 can be closed synchronously, or by energizing the brake B1 if this is a friction brake.
  Switching from Ip1 to Ic is then effected by energizing the clutch C as a result of which brake B1 becomes torqueless and can be opened. After this the clutch C can be closed completely.
  Switching from Ic to Ip1 is effected by energizing the electromotor as a generator so that clutch C becomes torqueless and can be opened. Then brake B1 can be closed completely.

An advantage of arranging the clutch device B2 as an electromotor is that it needs to generate much less power (maximum electrical power lower by a factor of 3 to 5 than the power of the combustion engine) than if the clutch device B1 were arranged as an electromotor.

Furthermore, the electromotor can also be used in combination with the bypass transmission P for functioning as a continuously variable transmission and as a hybrid system for recovering for example braking energy and starting or assisting the combustion engine. Furthermore, the electromotor may also be used for driving the vehicle purely electrically if the input shaft is braked (by means of freewheel bearing) or if also clutch C is energized. If also clutch C is energized, the combustion engine may be started during the ride or run along without injecting fuel.

2) Clutch C is arranged as a claw clutch.
  Just like 1), but different in that the switching from Ip1 to Ic is effected by energizing the electromotor B2 as a motor until the clutch C can be closed synchronously. However, this is at the cost of much electrical power at high performance.

Figure 4:
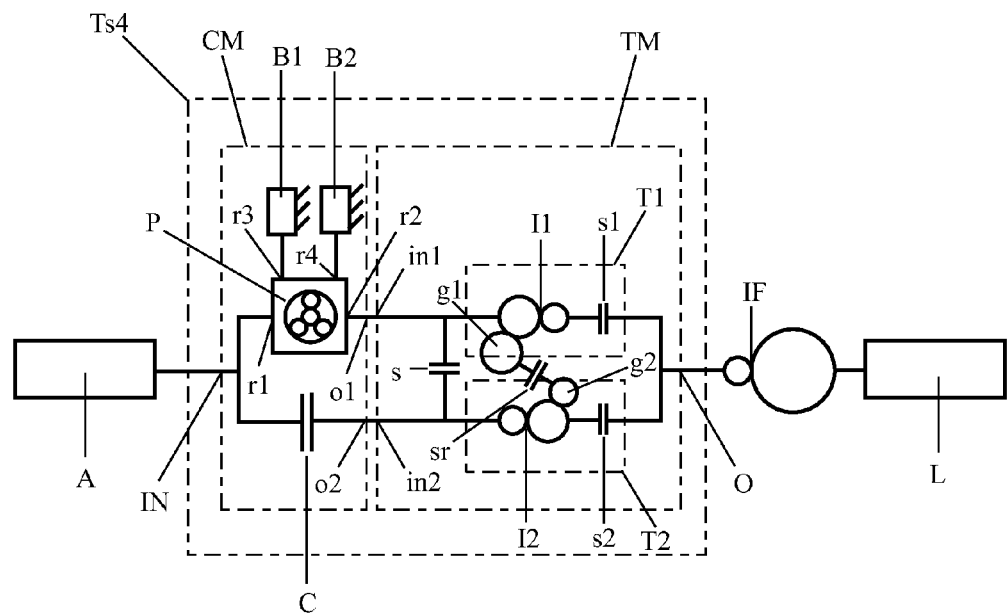
FIG. 4 shows a fourth embodiment of the transmission system according to the invention comprising two sub-transmissions and a reverse gear.

FIG. 4 shows a fourth embodiment of the transmission system according to the invention. All components of this transmission system that are similar to those of the first embodiment are referred to by like reference numerals. In this transmission system Ts4 the transmission module TM comprises a reverse gear which is located between the sub-transmissions T1 and T2 and which is formed by two extra gear wheels g1 and g2 and a reverse clutch sr located in between the two gear wheels. The two extra gear wheels are in engagement with gear wheels of the geared transmissions I1 and I2 of the sub-transmissions. The two extra gear wheels are positioned coaxially on a lay shaft (see FIGS. 5, 6 and 7). The transmission clutches are indicated by s1 and s2 and can be operated by means of a single switching fork and the reverse clutch sr can be operated by means of a further switching fork. The transmission clutches s1 and s2 may also be located on the input side in lieu of the output side of the sub-transmissions shown here.

In lieu of being located between the two sub-transmissions, the reverse gear may also be located within either of the sub-transmissions T1 or T2. In all embodiments the reverse gear can be arranged as an unsynchronized version (without synchromesh).

Figure 5:
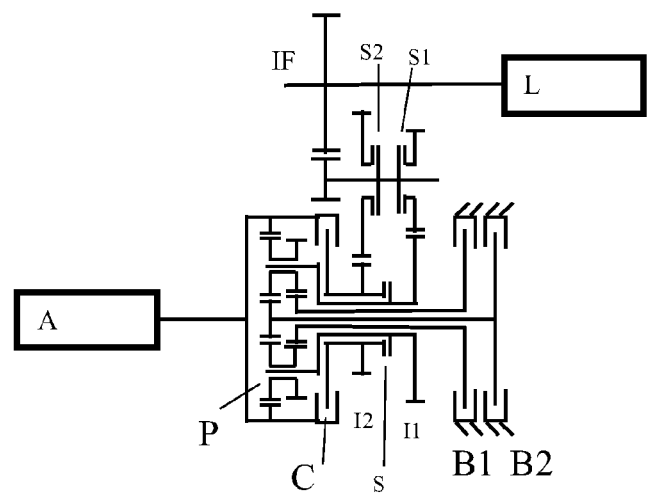
FIG. 5 shows a constructive embodiment of the transmission system shown in FIG. 4 having 5 or 6 gears.
Figure 6:
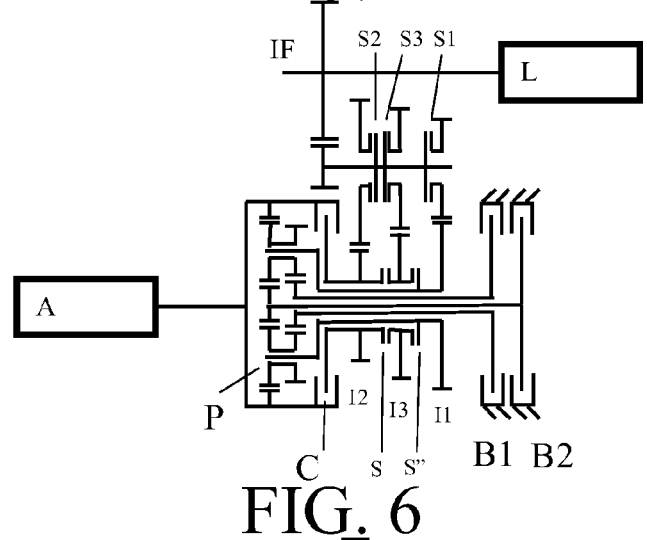
FIG. 6 shows a constructive embodiment of the transmission system shown in FIG. 4 having 8 or 9 gears.
Figure 7:
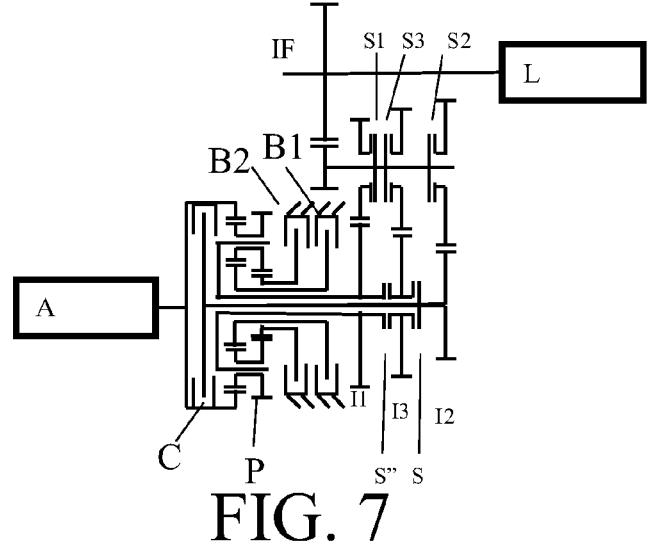
FIG. 7 shows another constructive embodiment of the transmission system shown in FIG. 4 having 8 or 9 gears.

The transmission module Ts4 is equiupped with a single lay shaft, see FIGS. 5, 6 and 7 (this is the shaft on which s1 and s3 are located), where the output of T1 and the output of T2 are coupled to the output of the transmission module by means of a single end drive IF. In contrast with that which is shown in FIG. 4, the first gear wheel of the end drive IF to the differential may be the same gear wheel as the second gear wheel of the geared transmission I1, where s1 is coaxial with the short circuit clutch s".

An embodiment of the transmission system shown in FIG. 4 is shown hereinafter in the form of a table:

| Gear | Ratio | Ratio step | B1 | C | s | B2 | S1 | S2 | SR |
|---|---|---|---|---|---|---|---|---|---|
| R | −15 | | x | | | | | x | x |
| N | | | | | | | | x | (x) |
| 1 | 16 | | x | | x | | | x | |
| 2 | 8.3 | 1.92 | | x | | | (x) | x | (x) |
| 3 | 5.1 | 1.65 | x | | (x) | | x | (x) | |
| 4 | 3.5 | 1.45 | | | | x | x | | |

-continued

| Gear | Ratio | Ratio step | B1 | C | s | B2 | S1 | S2 | SR |
|------|-------|-----------|----|----|----|----|----|----|----|
| 5    | 2.6   | 1.33      |    | x | x |    | x  |    |    |
| 1*   | 11    |           |    |   | x | x  |    | x  |    |
|      |       | RC 6.1    |    |   |   |    |    |    |    |

1* is an idler gear that can be used in a geometric ratio distribution with a constant step size, so that 6 gears are possible.

In lieu of the configuration shown in FIG. 4, a clutch SF (not shown) may be located between the second input in2 of the transmission module TM and the output O of the transmission module, which clutch SF can directly couple the second input and the output (without the intervention of a transmission). Furthermore, the geared transmission I2 and end drive IF may both be located within the second sub-transmission T2, where the output of the first sub-transmission T1 is connected in between these two geared transmissions to the second sub-transmission. In addition, a further clutch may be located between the speed transforming gear I1 and the end drive IF and the output of the transmission module, which further clutch is again located between the speed transforming gear I2 and end drive IF and the clutch SF.

FIGS. 5, 6 and 7 show three different constructive embodiments of the transmission system shown in FIG. 4, where the transmission system shown in FIG. 5 comprises 5 or 6 gears and the transmission systems shown in FIGS. 6 and 7 comprise 8 or 9 gears. The extra gear wheels of the reverse gear are not shown here for clarity's sake. In the embodiments shown in FIGS. 6 and 7 the short circuit clutches s and s" are positioned coaxially relative to the clutch devices B1, B2 and C. The transmission means P are arranged as a bypass transmission (planetary gear set) comprising four rotational members, of which the first rotational member is formed by a ring gear, the second rotational member is formed by a planet carrier and the third and fourth rotational members are formed by sun gears. An embodiment of the transmission system shown in FIG. 7 is shown hereinafter in the form of a table:

| Gear | Ratio | Ratio step | B1 | C | s   | s"  | B2 | S1 | S2  | S3  | SR  |
|------|-------|-----------|----|----|-----|-----|----|----|-----|-----|-----|
| R    | −17   |           | x  |   |     |     |    |    | x   |     | x   |
| N    |       |           |    |   |     |     |    |    | x   |     | (x) |
| 1    | 18    |           | x  |   | x   | x   |    |    | x   |     |     |
| 2    | 10.5  | 1.71      |    | x | (x) | x   |    |    | x   | (x) | (x) |
| 3    | 7.2   | 1.45      | x  |   | (x) | x   |    |    | (x) | x   |     |
| 4    | 5.4   | 1.33      |    |   | (x) | x   | x  |    |     | x   |     |
| 5    | 4.2   | 1.29      |    | x | x   | (x) |    |    |     | x   |     |
| 6    | 3.3   | 1.29      | x  |   | (x) | (x) |    | x  |     |     |     |
| 7    | 2.5   | 1.33      |    |   | (x) | (x) | x  | x  |     |     |     |
| 8    | 1.9   | 1.29      | x  |   | x   | x   |    | x  |     |     |     |
| 1*   | 13.5  |           |    |   | x   | x   | x  |    | x   |     |     |
|      |       | RC 9.4    |    |   |     |     |    |    |     |     |     |

Ratio is velocity of input shaft/velocity of output shaft

Figure 8:
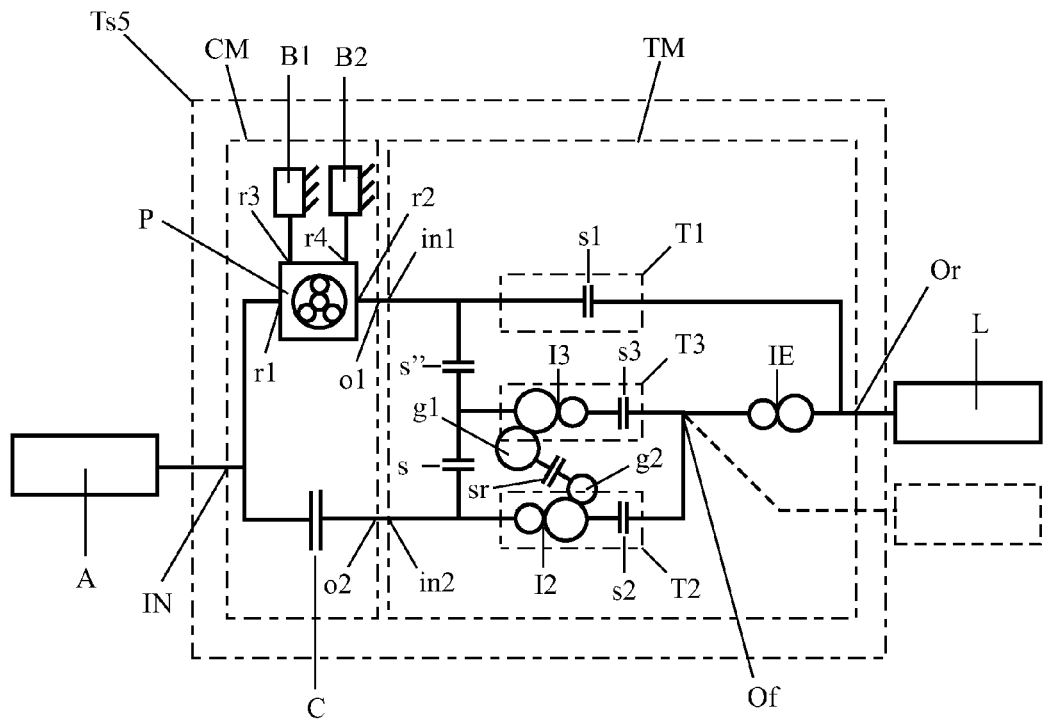
FIG. 8 shows a fifth embodiment of the transmission system according to the invention comprising three sub-transmissions and a reverse gear.

FIG. 8 shows a fifth embodiment of the transmission system according to the invention comprising three sub-transmissions and a reverse transmission. All components of this transmission system that are similar to those of the fourth embodiment are referred to by like reference numerals. Compared to the transmssion system shown in FIG. 4 this transmission system Ts5 comprises a third sub-transmission T3 (geared transmission I3 and transmission clutch s3) and a further short circuit clutch s". Furthermore, the speed transforming means of the first sub-transmission T1 is formed by a shaft (1:1 gear ratio). This transmission system can be used both for rear wheel drive (RWD), in which case the output is formed by Or and an extra geared transmission IE is located between the second and the third sub-transmission T2 and T3 and the output Or, and for front wheel drive (FWD), in which case the output is formed by Of and the extra geared transmission IE is located between the first sub-transmission T1 and the output Of (the extra geared transmission IE can in this case also form part of the first sub-transmission T1), as well as for four wheel drive.

Figure 9:
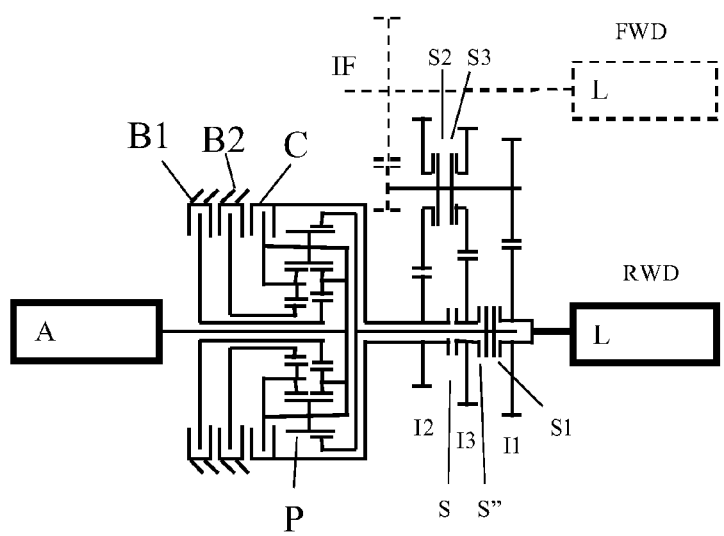
FIG. 9 shows a constructive embodiment of the transmission system shown in FIG. 8.

FIG. 9 shows a constructive embodiment of the transmission system shown in FIG. 8, where the ratio of the bypass transmission P with brake B1 closed=$(z+1)/z$ with $z=-4$, yields 0.6 (wa/wc) and where the ratio of the bypass transmission P with brake B2 closed=$(z+1)/z$ with $z=-4$, yields 0.75 (wa/wc).

The transmission systems described hereinbefore can:
- be used for rear-wheel drive, where the output is connected to a rear differential via a differential gearbox;
- be used for four wheel drive, where either the front wheel configuration (transversely mounted engine) or the rear wheel configuration (longitudinally mounted engine) is taken as a basis;
- be arranged with any random planetary gear set with brake and clutch;
- be combined with all embodiments of the planetary gear set with brake and clutch shown in the drawings;
- be provided with any possible embodiments of a reverse gear; and
- be provided with any possible embodiments of a parking mechanism.

Albeit the invention has been described in the foregoing based on the drawings, it should be observed that the invention is not by any manner or means restricted to the embodiments shown in the drawings. The invention also extends to all embodiments deviating from the embodiments shown in the drawings within the spirit and scope defined by the claims.

For example, the transmission system may further be provided with an electromotor which is coupled or can be coupled to one or more of the elements of the transmission system. The components of the transmission system are for example the speed transforming gears, clutches, rotational members etc. mentioned above. The electromotor may then be used for synchronisation of one or more of the transmission clutches and the clutch. In this case the electromotor is preferably connected to the second output of the clutch module and/or second input of the transmission module, where the electromotor assists the switching from one gear to the next in such a way that the electromotor reduces the energy dissipation of the energizing means of the brakes or the clutch.

Likewise the electromotor (motor/generator) may be used for driving the vehicle and/or assisting the combustion engine. In that case the electromotor is preferably coupled to an arbitrary shaft of the transmission system. The electromotor is in this case preferably coupled in such a way that it is also possible to drive purely electrically while the combustion engine can be disengaged from the transmission system. Preferably, however, the electromotor is in this case located between the drive source and the clutch module.

Furthermore, in one of the above transmission systems a torque converter may be located between the combustion engine and the input of the clutch module. The clutch actuation may then be situated concentrically around oil input/output of the torque converter.

Further, in all embodiments described above, a further speed transforming gear may be located between the two outputs of the clutch module and/or the two inputs of the transmission module, which further speed transforming gear is connected in series with the transmission short circuit clutch(es).

What is claimed is:

1. A transmission system comprising:

a clutch module, having a single input, a first output, and a second output;

a first clutch device positioned between the first output and the input;

a second clutch device positioned between the second output and the input;

a transmission module, having a single output and a first and a second input, where between the first input and the output is located a first sub-transmission equipped with at least a single speed transforming gear and/or a single transmission clutch, and between the second input and the output is located a second sub-transmission also equipped with at least a single speed transforming gear and/or a single transmission clutch;

where the two outputs of the clutch module are connected to the two inputs of the transmission module;

a third clutch device, and between the input and the first output are located transmission means comprising at least four rotational members, a first rotational member of which is connected to the input, a second rotational member of which is connected to the first output, a third rotational member, and a fourth rotational member of which are connected to the first and the third clutch devices, respectively;

wherein the transmission system comprises a short circuit clutch which is located between the two outputs of the clutch module and/or the two inputs of the transmission module; and wherein the transmission system comprises a further short circuit clutch which is also located between the two outputs of the clutch module and/or the two inputs of the transmission module and is connected in series with the short circuit clutch, where the two outputs of the clutch module and/or the two inputs of the transmission module can only be coupled together by closing the two short circuit clutches.

* * * * *